A. N. MILLER AND D. W. FRACKELTON.
WATER COLUMN FOR BOILERS.
APPLICATION FILED AUG. 10, 1918.
1,322,598.
Patented Nov. 25, 1919.
2 SHEETS—SHEET 1.
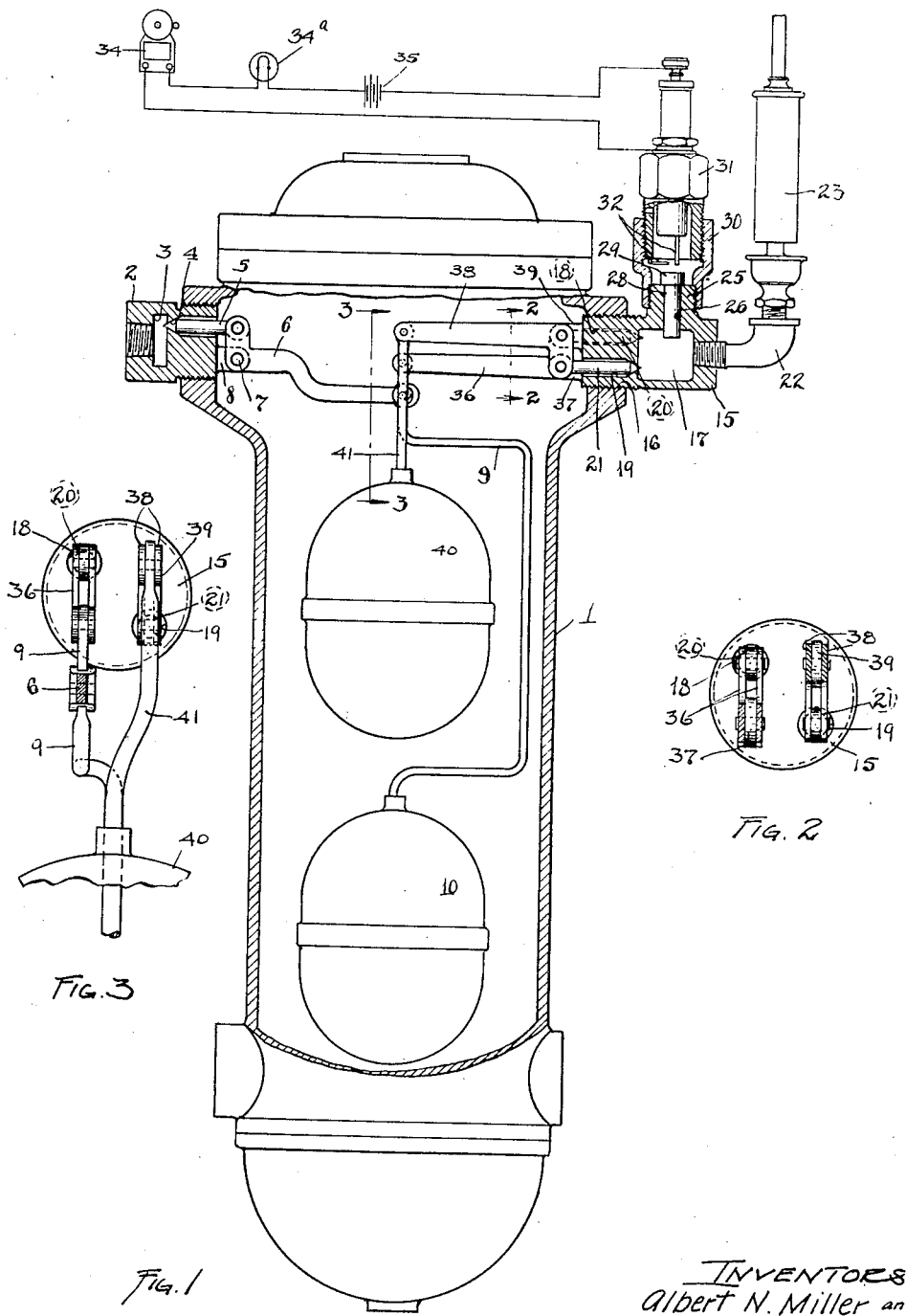
INVENTORS
Albert N. Miller and
David W. Frackelton.
BY Fay, Oberlin & Fay
ATTORNEYS.

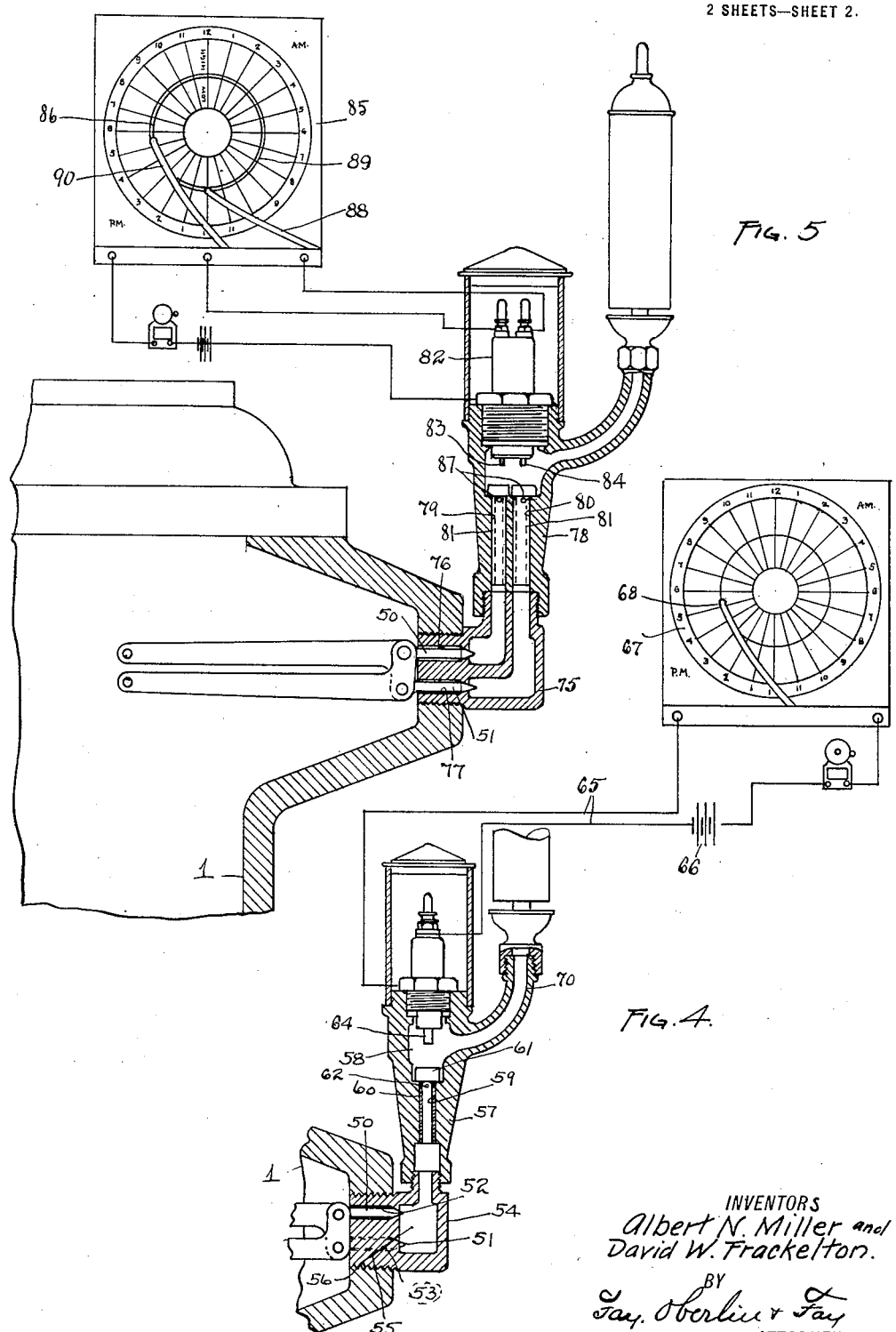

UNITED STATES PATENT OFFICE.

ALBERT N. MILLER AND DAVID W. FRACKELTON, OF CLEVELAND, OHIO, ASSIGNORS TO THE RELIANCE GAUGE COLUMN COMPANY, OF CLEVELAND, OHIO, A CORPORATION OF OHIO.

WATER-COLUMN FOR BOILERS.

1,322,598.      Specification of Letters Patent.      Patented Nov. 25, 1919.

Application filed August 10, 1918. Serial No. 249,225.

*To all whom it may concern:*

Be it known that we, ALBERT N. MILLER and DAVID W. FRACKELTON, citizens of the United States, and residents of Cleveland, county of Cuyahoga, State of Ohio, have jointly invented a new and useful Improvement in Water-Columns for Boilers, of which the following is a specification, the principle of the invention being herein explained and the best mode in which we have contemplated applying that principle, so as to distinguish it from other inventions.

The present invention relates to improvements in columns for boilers, and more particularly relates to alarm mechanism actuated by the rise or fall of water in such column. Recording means are also employed so that a complete record of the operation of the column is available at all times. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is a vertical section through a column showing our improved alarm operating mechanism; Fig. 2 is a section on the line 2—2, Fig. 1; Fig. 3 is a section on the line 3—3, Fig. 1; Fig. 4 is a view similar to Fig. 1 but showing a modified form of alarm mechanism and recording means; and Fig. 5 is a similar section showing a different type of mechanism and recording means.

The usual gage column 1 is provided with an inlet pipe 2 having an aperture 3 formed to provide a seat 4 for a float operated valve 5. This valve 5 is pivotally connected to one end of a bell crank lever 6 which is mounted about a pin 7 carried in a boss or lug 8 formed on the pipe 2. At its other end the lever 6 is connected to link 9 attached to the float 10. When the water drops below a certain level the float drops and opens the valve 5 and allows water to enter the column. Opposite to the inlet pipe is a threaded nipple 15 received in a tapped aperture 16 in the upper part of the column and this nipple has a chamber 17 with two apertures 18 and 19 leading into the interior of the column and forming seats for the float actuated valves 20 and 21.

Into the end of the nipple 15 a hollow elbow 22 is threaded connecting the chamber 17 with a whistle 23 carried by the elbow. On the upper side of the nipple is a threaded boss 25 having an aperture 26 therethrough. A piston 28 is mounted through such aperture and is provided with a head 29 seating on the upper face of the boss. A sleeve 30 is threaded on said boss and carries an insulated plug 31 which is threaded into said sleeve. The two contacts 32 of the plug are connected in circuit with a bell 34 or other alarm signal, such as a light 34$^A$, and a battery 35.

The upper valve 20 is pivotally connected to the short end of a bell crank 36 which in turn is pivotally mounted in a boss 37 on the nipple and has its longer arm connected to the extending end of the link 9 attached to the float 10. The lower valve 21 is similarly connected to a bell crank 38 pivotally mounted on a boss 39, the bell crank being connected to the upper float 40 by means of a rod 41.

In operation when the water level falls below the desired level the float 10 falls, opening the valves 5 and 20 which admits water to the columns through valve 5 and allows the steam to pass through valve 20 into the chamber 17. The steam forces the piston 28 upwardly until it bridges the contacts 32 of the insulated plug thus closing the electric alarm circuit. The steam also passes out through the elbow 22 and blows the whistle to give additional warning. The bell, burning light, recorder, or other warning signal, will usually be located in the office of the engineer or superintendent, while the whistle is mounted on the column thus giving the alarm in two places.

High water in the column operates the valve 21, admitting steam to the chamber through the aperture 19 and causing the whistle to blow and the bell or alarm to be sounded as in the case of low water.

In the modified form in Fig. 4, the low and high water valves 50 and 51 correspond to the valves 20 and 21 of Fig. 1 and seat in apertures 52 and 53 in a nipple 54 having a threaded boss 55 with an aperture 56. On the boss is threaded a housing 57 provided with an upper chamber 58 connected with the opening 56 by a hole 59, in which a piston 60 is mounted. The piston is preferably hollow and is provided with a series of apertures 62 near its upper end. An insulated plug is mounted in the uper part of the casing and is provided with a point 64 adapted to be contacted by the piston head to close the electrical circuit containing a battery 66, a recorder 67, and any other suitable warning signal, such as a bell or light. The recording device has a revolving chart which contacts a pen 68. The plug is grounded and when the circuit is closed the pen is moved radially, thus marking the chart to show the exact time of the operation. A whistle is mounted on the hollow extension 70 of the housing and when the piston is raised the fluid pressure or steam escapes through the apertures 62 and around the piston to blow the whistle.

The piston is hollowed out to lighten the same, but may be solid, in which case the steam or other fluid pressure escapes around the same.

A slightly different form is illustrated in Fig. 5, the nipple 75 having two passages 76 and 77 carrying the seats for the valves 50 and 51, respectively. The housing 78 mounted on the nipple has two passages 79 and 80 alined with the passages in the nipple and having preferably hollow pistons 81 provided with ports 87 mounted therein. Above the pistons is a single chamber having an insulated plug 82 at the top thereof. This plug has two independently insulated points 83 and 84, each adapted to be contacted by one of the pistons. The low water valve operates to close the circuit of the recorder 85 through the contact 83 thus moving the pen 90 inwardly from the circle 86. The other contact 84 operates another arm and pen 88 outwardly from a second circle 89 to show when the high water valve is open. Different colored inks will be used by the pens so that the chart may be easily read and the different operations clearly indicated. In this form the plug is grounded and the two points close the circuit through the recorder, the bell or light, and the battery. A whistle is also used in this form and operates the same as that shown in Fig. 4, both pistons discharging through the whistle as soon as they are raised, the fluid pressure discharging around the pistons and through the small ports or openings 87.

While illustrated as having the valves actuated from independent floats, the device may of course be connected so that the valves are all operated from a single float. For operation of the whistle and the piston the device is not confined to the use of steam, but any fluid pressure means may be employed and air pressure will often be used where available.

It will be seen that the present mechanism operates to warn the attendant of either high or low water in the column and at the same time the electrical contacts are closed by a pressure actuated piston. These contacts are arranged to operate either a warning signal such as a bell, light, or other warning signal, or to work the recorder to give a complete record of the day's operation. The bell, or light, or other warning signal may be placed in circuit with the recording device, which is usually mounted in the superintendent's office to give a check on the operation of the boiler. The warning signal or whistle on the column warns the boiler room attendant and the bell or light may be located at any desired point to inform the engineer in charge of the operation of the device.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a water column for boilers the combination of a chambered nipple mounted in said column, float actuated valves in said nipple and opening into such chamber, fluid pressure means in said nipple adapted to be operated by pressure admitted to such chamber from said column and adapted upon operation to close an electrical signal circuit.

2. In a water column for boilers the combination of a chambered nipple mounted in said column, two float actuated valves in said nipple and opening into such chamber, a fluid pressure operated piston mounted in said nipple and extending into such chamber and adapted to be moved by fluid pressure admitted to said chamber through said valves, and an electrical circuit including a signal adapted to be closed by movement of said piston.

3. In a water column for boilers the combination of a chambered nipple mounted in said column, two float actuated valves in said nipple and opening into such chamber, a fluid pressure operated piston mounted in said nipple and extending into such chamber and adapted to be moved by fluid pressure admitted to said chamber through said valves, an electrical circuit including a signal adapted to be closed by said piston in its upward position, an exhaust outlet in such chamber, and a fluid pressure operated alarm connected to such outlet.

4. In a water column for boilers, the combination of a nipple mounted in said column and provided with a chamber and apertures from said chamber to said column, two float actuated valves in such apertures, a casing mounted on said nipple and having connection with said chamber, a piston mounted in said casing and adapted to be operated by admission of fluid pressure to said chamber, electrical contacts in said casing adapted to be bridged by said piston in one position, and an exhaust conduit for such fluid pressure, said conduit mounting a fluid pressure actuated alarm.

5. In a water column for boilers, the combination of a nipple mounted in said column and provided with a chamber and apertures from said chamber to said column, two float actuated valves in such apertures, a casing mounted on said nipple and having connection with said chamber, an insulated plug mounted in said casing and having a contact adapted to be engaged by said piston, an electrical circuit including an indicator connected to said piston and said plug and adapted to be closed by movement of said piston, an exhaust outlet for such fluid pressure, and a whistle connected to such outlet.

6. In a water column for boilers, the combination of a nipple mounted in said column and provided with a chamber and apertures from said chamber to said column, two float actuated valves in such apertures, a casing mounted on said nipple and having connection with said chamber, a piston mounted in said casing and operable by fluid pressure from said chamber upon opening of said valves, the fluid pressure exhausting around said piston upon upward movement of the same, an electrical circuit including a contact mounted in said casing and adapted to be engaged by said piston upon upward movement, said circuit including recording means, and an exhaust opening in said casing, a whistle connected to said exhaust opening, whereby an alarm is simultaneously given with the operation of the recording mechanism.

7. In a water column for boilers, the combination of a nipple mounted in said column and provided with a chamber and apertures from said chamber to said column, two float actuated valves in such apertures, a casing mounted on said nipple and having connection with said chamber, a hollow piston mounted in said casing and operable by fluid pressure from said chamber upon opening of said valves, exhaust ports in said piston openable upon upward movement of the same, an electrical circuit including a contact mounted in said casing and adapted to be engaged by said piston upon upward movement, said circuit including recording means, and an exhaust opening in said casing, a whistle connected to said exhaust opening, whereby an alarm is simultaneously given with the operation of the recording mechanism.

8. In a water column for boilers, the combination of a nipple mounted in said column and having two apertures therethrough, float actuated valves mounted in said apertures, a casing mounted on said nipple and having two apertures alined with such apertures in the nipple, hollow pistons mounted in such apertures and having heads closing the same, apertures in said pistons adapted to be opened upon upward movement of said pistons, an insulated plug mounted in said casing above said pistons and having contacts adapted to be engaged by said pistons in their upward positions, a whistle connected to said casing above said pistons, a record connected in circuit with said plug contacts, movement of said valves being adapted to admit fluid pressure through said nipple and casing to operate said pistons and said recorder, such fluid pressure exhausting through said whistle to sound an alarm.

Signed by us, this 6 day of August, 1918.

ALBERT N. MILLER.
DAVID W. FRACKELTON.